(12) United States Patent
Brax

(10) Patent No.: US 11,433,707 B1
(45) Date of Patent: Sep. 6, 2022

(54) HYBRID TIRES

(71) Applicant: Matthew J. Brax, Denver, CO (US)

(72) Inventor: Matthew J. Brax, Denver, CO (US)

( * ) Notice: Subject to any disclaimer, the term of this patent is extended or adjusted under 35 U.S.C. 154(b) by 0 days.

(21) Appl. No.: 17/397,105

(22) Filed: Aug. 9, 2021

Related U.S. Application Data

(60) Provisional application No. 63/062,686, filed on Aug. 7, 2020.

(51) Int. Cl.
*B60C 7/00* (2006.01)
*B60C 23/04* (2006.01)
*B60C 7/12* (2006.01)

(52) U.S. Cl.
CPC .............. *B60C 7/125* (2013.01); *B60C 23/04* (2013.01)

(58) Field of Classification Search
CPC .. G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236;
(Continued)

(56) References Cited

U.S. PATENT DOCUMENTS 3,072,171 A 1/1963 Drakeford et al.
3,151,913 A 9/1964 Nebout
(Continued)

FOREIGN PATENT DOCUMENTS

CN 212148263 U * 12/2020
CN 112829518 A * 5/2021
EP 3871902 A1 * 9/2021 ........... B60C 13/002

*Primary Examiner* — Andre J Allen
(74) *Attorney, Agent, or Firm* — Sandy Lipkin

(57) ABSTRACT

The invention described tires resisting temperature over 180 degrees Fahrenheit, using both pneumatic and non-pneumatic properties in conjunction to support the integrity of the tire on pneumatic rims where the tire's main sections are the two beads, the air pocket, the elastomeric flection design, shear band, and the tread. A premium tire assembly comprising of elastomeric and flexible properties, which supports the pneumatic air pocket and is reasonably secured onto the rim with circularly radial beads. The said tire uses elastic and flexible properties to support the load of the vehicle instead of using pneumatic properties alone. All of the sections are joined by a framework. The elastomeric flection and pneumatic air pocket combination technology alone makes Hybrid Tires unique and revolutionary.

5 Claims, 9 Drawing Sheets

(58) Field of Classification Search
CPC ............. G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.8
See application file for complete search history.

(56) References Cited

U.S. PATENT DOCUMENTS

| | | | |
|---|---|---|---|
| 3,157,542 A | 11/1964 | Trevaskis | |
| 4,071,386 A * | 1/1978 | Gomberg | B29D 30/04 152/339.1 |
| 5,419,383 A * | 5/1995 | Iwamura | B60C 9/0042 152/209.1 |
| 5,551,498 A * | 9/1996 | Komatsuki | B60C 9/0042 152/451 |
| 5,558,144 A * | 9/1996 | Nakayasu | B60C 9/2009 152/526 |
| 2004/0261925 A1* | 12/2004 | Chen | B60C 7/105 152/151 |
| 2005/0183808 A1* | 8/2005 | Barguet | B60C 9/2003 152/527 |
| 2009/0173421 A1* | 7/2009 | Love | B60C 7/10 152/246 |
| 2012/0193004 A1* | 8/2012 | Anderson | B60C 7/22 152/310 |
| 2016/0107485 A1* | 4/2016 | Lee | B60C 9/0042 152/451 |
| 2017/0174003 A1* | 6/2017 | Benzing, II | B60C 7/26 |
| 2017/0174004 A1* | 6/2017 | Benzing, II | B60C 7/102 |
| 2019/0329592 A1* | 10/2019 | Benzing, II | B60C 7/00 |

* cited by examiner

HYBRID TIRES

REFERENCE TO PRIOR APPLICATION

This application claims priority of the provisional patent application 63/062,686, filed Aug. 7, 2020 entitled HYBRID TIRES by Matthew J. Brax.

BACKGROUND OF THE INVENTION

Field of the Invention

This invention relates to the tires for commercial and personal vehicles. The invention more particularly is an assembly and shaping method for a new hybrid tire that not only can use air pressure, but also uses non-pneumatic properties to support the weight of the vehicles load.

Description of the Related Art

According to the National Highway Traffic Safety Administration (NHTSA) under-inflated tires can lead to poor handling, slower stopping, increased stress on tire components, and heat build-up. These problems can lead to "catastrophic failure of the tire, such as separation or blowout". The NHTSA goes on to say that under inflation also decreases fuel economy.

One study shown by the NHTSA showed that in 2003 about 414 people died in accidents caused by flat tires or blowouts, there were 10,275 injuries and 78,392 crashes associated with flat tire or blowout accidents.

Airless tires have been used for years on many tractors and other construction type vehicles. Newer models of airless tires can even be used on cars. The problem with the newest models of airless tires is that they require a different wheel set up, making air sensors and rims obsolete.

There are many inventions that have been found in this regard. For instance a U.S. Pat. No. 3,151,013 issued to Dunlop Rubber Co Ltd discloses a method for assembling and shaping a pneumatic tire comprising an inflatable shaping unit, for supporting and shaping a cylindrical tire carcass having a pair of bead supporting members and means for moving said members towards and away from one another symmetrical in relation to the mid-circumferential plane of the shaping unit, and a carrying means, said carrying means comprising a rigid cylindrical annulus, a plurality of spring fingers disposed in spaced relationship around the inner periphery of the annulus and an inflatable member located between at least a portion of each of the fingers and the annulus, said member being inflatable to move the fingers inwardly to grip a tread or a breaker or both, and said carrying means and shaping unit being relatively movable axially in relation to one another to move a breaker or tread or both secured within the carrying means in the form of a single annulus, into a position in which the beaker or tread or both is symmetrically disposed in relation to a carcass supported by the shaping unit.

A method of building a pneumatic tire bearing U.S. Pat. No. 3,157,542A from rubber on rubberized fabric sheet material comprising laying one surface of one end portion of a continuous sheet of the material on a pair of supporting members positioned so that one edge of the first of the said members is parallel with and closely adjacent to an edge of the second of said members, severing the material between said edges to leave a first severed portion of said sheet material on a surface of the first member and to leave an end portion of the remainder of said continuous sheet supported on a surface of said second member which is similar to said surface of said first member preparatory to the application of a second severed portion of the sheet by the second member to a former, pressing said first severed portion into contact with the surface of a rotatable former or the surface of a partly-built tire carried on the former, wrapping the first severed portion around, and transferring the portion to, the former, by simultaneously rotating the former and moving said surface of the first supporting member in a direction substantially tangential to the former surface.

A pneumatic tire bearing U.S. Pat. No. 3,072,171A issued to Dunlop Rubber Co Ltd comprising a carcass having at least one annular disc-shaped bead reinforcement in each bead region formed solely from rubberized filamentary material extending circumferentially around the tire at the bead region in a plurality of adjacent, spiral, convolutions, the radially inner convolutions at least being within said bead region and at least one ply of reinforcement of rubberized cords extending across the tread region and down the sidewalls of the tire into adhesive contact with one side of said disc-shaped reinforcement and terminating at said side of said reinforcement with which it is in contact with said bead region.

A U.S. Pat. No. 3,151,013A, mentioned previously, also discloses an apparatus for assembling and shaping a pneumatic tire comprising an inflatable shaping unit, for supporting and shaping a cylindrical tire carcass having a pair of bead supporting members and means for moving said members towards and away from one another symmetrical in relation to the mid-circumferential plane of the shaping unit, and a carrying means, said carrying means comprising a rigid cylindrical annulus, a plurality of spring fingers disposed in spaced relationship around the inner periphery of the annulus and an inflatable member located between at least a portion of each of the fingers and the annulus, said member being inflatable to move the fingers inwardly to grip a tread or a breaker or both, and said carrying means and shaping unit being relatively movable axially in relation to one another to move a breaker or tread or both secured within the carrying means in the form of a single annulus, into a position in which the beaker or tread or both is symmetrically disposed in relation to a carcass supported by the shaping unit.

The current invention proposes to present advancement in tire development called Hybrid Tires, which is developed to provide the premium quality and consistency to avoid danger for the passengers in case of tire damage. For most standard vehicles, it is common to use air pressure to support the load of the vehicle. However, pneumatic tires can be very dangerous if there is a puncture or blowout. The tire can fold under the rim and cause the driver to lose control. For this reason, most standard pneumatic vehicles use air sensors to let the driver know if the pneumatic PSI level is too low in the tires. Said invention discloses a new hybrid tire that uses elastomeric designs to carry the weight of the vehicle and its cargo while also using pneumatic pressure monitoring for safety. The current invention Hybrid Tires fits on most modern day standard pneumatic rims and gives purpose to the tire pressure monitoring system ("TPMS") and rims.

According to the NHTSA, all passenger cars, light trucks, and vans that are Model Year 2008 or newer are equipped with TPMS, which can be an essential requirement for passenger's safety. A NHTSA study of tire inflation pressure and tire pressure-monitoring systems (TPMS) showed that 12 percent of all passenger vehicles in the United States of model years 2004-2011 (with and without TPMS) have at least one tire under-inflated by at least 25 percent. Hybrid Tires propose to use already existing TPMS to help monitor the wheels in case of displacement, or other air leak, thus promoting safer traveling.

None of the previous inventions and patents, taken either singly or in combination, is seen to describe the invention as claimed. Hence, the inventor of the present invention proposes to resolve and surmount existent technical difficulties to eliminate the aforementioned shortcomings of prior art.

SUMMARY OF THE INVENTION

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

It is therefore the purpose of the invention to alleviate at least to some extent one or more of the aforementioned problems of the prior art and/or to provide the relevant public with a suitable alternative thereto having relative advantages.

The primary object of the invention is related to present a hybrid tire that is a crossbreed between pneumatic and non-pneumatic tires.

It is furthermore the objective of the invention to provide a hybrid tire that uses elastomeric flection designs and has pneumatic properties for compliance and safety standards.

When the tire is mounted and filled with air, the tire becomes pneumatic in nature.

It is also the objective of the invention to provide an assembly, which uses elastomeric properties to carry the load, with the outward pressure of compressed air for the pneumatic air pocket's pneumatic support and monitoring.

It is furthermore the objective of the invention to provide a pneumatic air pocket with two beads for securing the hybrid tire onto the rim.

It is an objective of the invention to provide an assembly, which utilizes elastomeric and flexible materials.

It is one of the main objectives of the invention to focus on an assembly where the main tire sections include the tread, shear band, elastomeric flection design, pneumatic air pocket, and two beads.

It is also an objective of the invention to provide a new, safe, efficient, and reliable tire.

It is the objective to show the exact unique combination of sections that make up Hybrid Tires.

It is an objective to show that the Hybrid Tires can be made in more than one way.

It is the objective to show how the combination of an elastomeric flection design for carrying the load, companied with pneumatic air pressure for monitoring and support, with two beads for securing a tire on traditional pneumatic rims, is unique and revolutionary.

It is the objective to point out what makes Hybrid Tires unique, using formulas comprised of the different main sections and a specific region of defining what is unique and revolutionary about said invention.

This. Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

The basic embodiment of the present invention teaches a hybrid tire that provides airless sections for use with vehicles comprising: an outside surface in the shape of a circle composed of tread where the tire contacts a road; a shear band adjacent said tread; a compressible area adjacent said shear band wherein an elastomeric flection design is contained that can flex with the application of pressure; an air pocket adjacent said compressible area; a pair of beads adjacent said air pocket on either side of said tire for securing said tire to a rim.

The above embodiment can be further modified by defining that said rim is equipped with a tire pressure monitoring system.

The above embodiment can be further modified, such as adding butyl, by defining that said air pocket can be pneumatically filled with air.

The above embodiment can be further modified by defining that said tread is reinforced with additives and reinforcements for greater strength and durability.

BRIEF DESCRIPTION OF THE DRAWINGS

For a better understanding of the present invention, reference is to be made to the accompanying drawings.

FIG. 4A is a graphical/symbolic representation of the novel aspects of the instant invention.

FIG. 4B further illustrates the components of the instant invention in graphical/symbolic as well as numeric form.

DETAILED DESCRIPTION OF THE PREFERRED EMBODIMENT

Figure 1:
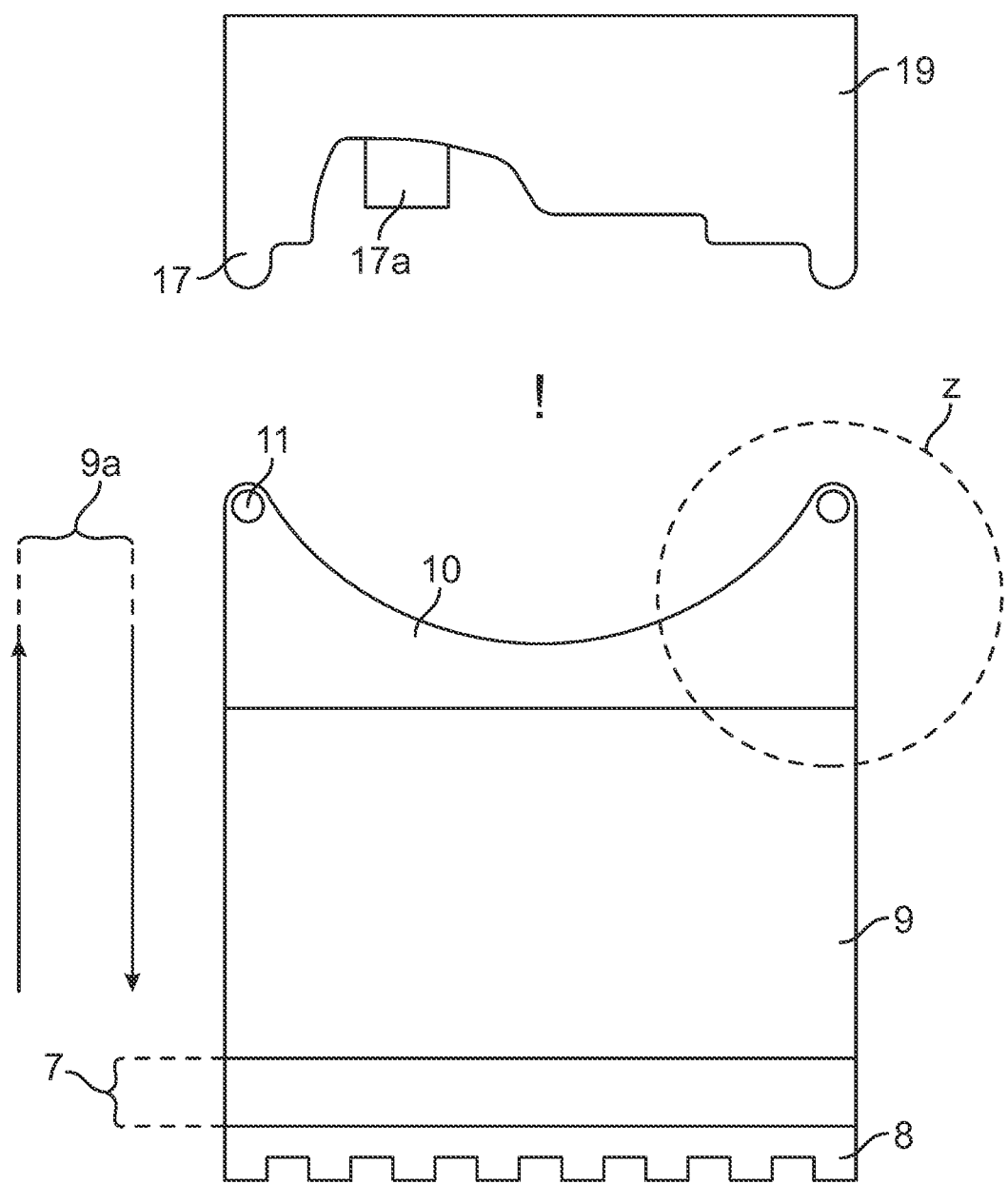
FIG. 1 is a cut out view of the hybrid tire of the instant invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Hybrid Tires is a new crossbreed tire line that is not only pneumatic capable, but also uses elastomeric and flexible properties to support the weight of the vehicle's load. Said Hybrid tires have a pneumatic air-filled inner core that is used to support stability and give purpose to the TPMS and rims. However, said tire does not depend on air pressure for securing said tire to the counterpart. A tread, usually reinforced with additives and reinforcements, provides the contact area for the road. Pneumatic tires can puncture easily, resulting in the driver losing control of the vehicle. Non-pneumatic tires can't fit on most standard pneumatic vehicle's rims, causing the TPMS and rims to become obsolete.

Hybrid Tires keep people safe by using flexible properties, instead of just pneumatic air alone to support the load of the vehicle. This invention also gives said tire a purpose to the TPMS and rims by leaving space inside the pneumatic air pocket. Hybrid Tires were developed to fit on most conventional pneumatic rims, but not rely on pneumatic air pressure. The conjunction of the pneumatic air pocket, two beads, tread, shear band, and elastomeric flection design with underlying framework is what makes this tire different than anything else. Another exact point of differentiation is where the elastomeric flection section meets the air pocket and beads.

Hybrid tires are not limited to large vehicles alone. Hybrid tires were invented to be able to produce tires of any size for pneumatic rims. The advantage for vehicle with TPMS is that the existing equipment can be utilized for extra safety measures.

The polymers act similar to a spring by giving the wheel elastomeric flection and resistance capabilities. This invention pertains to the conjunction of sections of tread, shear band, pneumatic air pocket, and two beads, connected by a framework, not just the materials being used. More specifically, this invention pertains to the unique combination of an elastomeric flection design for carrying the load of the vehicle, in conjunction with a pneumatic air pocket, which is used for support and monitoring, and two beads which are used to secure the tire onto the rim.

Said tire can be made by means of molding.

The shear bands of said tire helps support the load of the vehicle.

If a nail or another sharp material punctures the tires pneumatic air pocket and causes a small hole, the tire itself won't necessarily be compromised, but the driver will be notified that there is a puncture in the pneumatic air pocket. This means that if there's a major disturbance causing a puncture in the pneumatic air pocket, or displacement of the rim causing an air leak, the driver will be notified to examine the wheels. The TPMS allows the user to know that their tire is secured on the rim and there is not damage to the core pneumatic air pocket.

Hybrid tires were developed to be safer than traditional pneumatic tires against sharp objects on the road, by providing non-pneumatic space between the tread's contact point with the road and the pneumatic-capable air pocket. The entire tire is held together with a framework that allows for the separation of the contact point and the pneumatic-capable space.

Hybrid Tires are comprised largely of polymers.

This invention pertains to the combination of preferred elastomeric and flexible material to carry the load of the vehicle using the flection design of choice, two beads which secure the tire to the rim, and a pneumatic air pocket to monitor the wheel assembly and gives purpose to existing pneumatic rims.

With all of the ways to make said invention, said invention is identified by the sectional formulas described. This set of components combined, defines its own class of tire. Said tire is defined by the sectional areas combined by a network of desired flexible materials—tread, shear band, elastomeric flection design of choice, two annular beads, and a pneumatic air pocket. The invention is innovative because of the unique combination of the elastomeric flection design, two annular beads, and a pneumatic air pocket. The elastomeric flection design and air pressure monitoring and support using existing equipment, is part of what makes Hybrid Tires unique and revolutionary.

While there are many ways to make Hybrid Tires, an important part of this invention is the unique and revolutionary combination of two beads, a pneumatic air pocket, an elastomeric flection design, shear band, and tread all working together supported by framework. The two beads are the preferred embodiment, allowing the tire to reasonably secure to the standard vehicle's rims without the need for air pressure, unlike any other tire that is supported by a strong elastomeric and flexible design. Where the beads meet the flexible design and pneumatic capable air pocket is a basis for a unique and revolutionary discovery.

Although there are many designs and materials within the scope of this patent, using a template of choice that includes the following embodiments (and more importantly the sections) will create said hybrid tires.

The polymeric materials are shaped into the desired tire design of choice.

The two annular bands for the beads can be made with a strong steel, alloy, or other similar working material.

Reinforcing materials can be employed into the hybrid tires to enhance performance.

Said tires unique quality is in the way that the pneumatic air pocket fits on standard rims and is able to use a flexible design area to help support the load of the vehicle. It is the area at which the air pocket and elastomeric flection design meet the two beads that makes this tire unique and revolutionary.

Turning to the drawings, the preferred embodiment is illustrated and described by reference characters that denote similar elements throughout the several views of the instant invention.

The preferred embodiment of the instant invention provides for a hybrid tire that offers the benefits of an airless tire but that can be used with modern vehicles that include pneumatic capable rims. FIG. 1 provides a cut out view of an exemplary tire showing the essential parts. What makes the tire unique is the combination of the air pocket 10, the beads 11 and the elastomeric, flexible design 9 at the junction of these components Z. Where the reinforced network or pathways of underlying substrate joins the sections 12. The tires can compress or expand and this illustrated at 9a. The tire is attached to a rim 19. Where the rim 19 contacts the tire 17 is the tire pressure management system (TPMS) sensor 17a. A pair of beads 11 are found adjacent to the air pocket 10 which sits between the compressible area 9 and a shear band 7 which is adjacent to the tread 8 of the tire.

Figure 2:
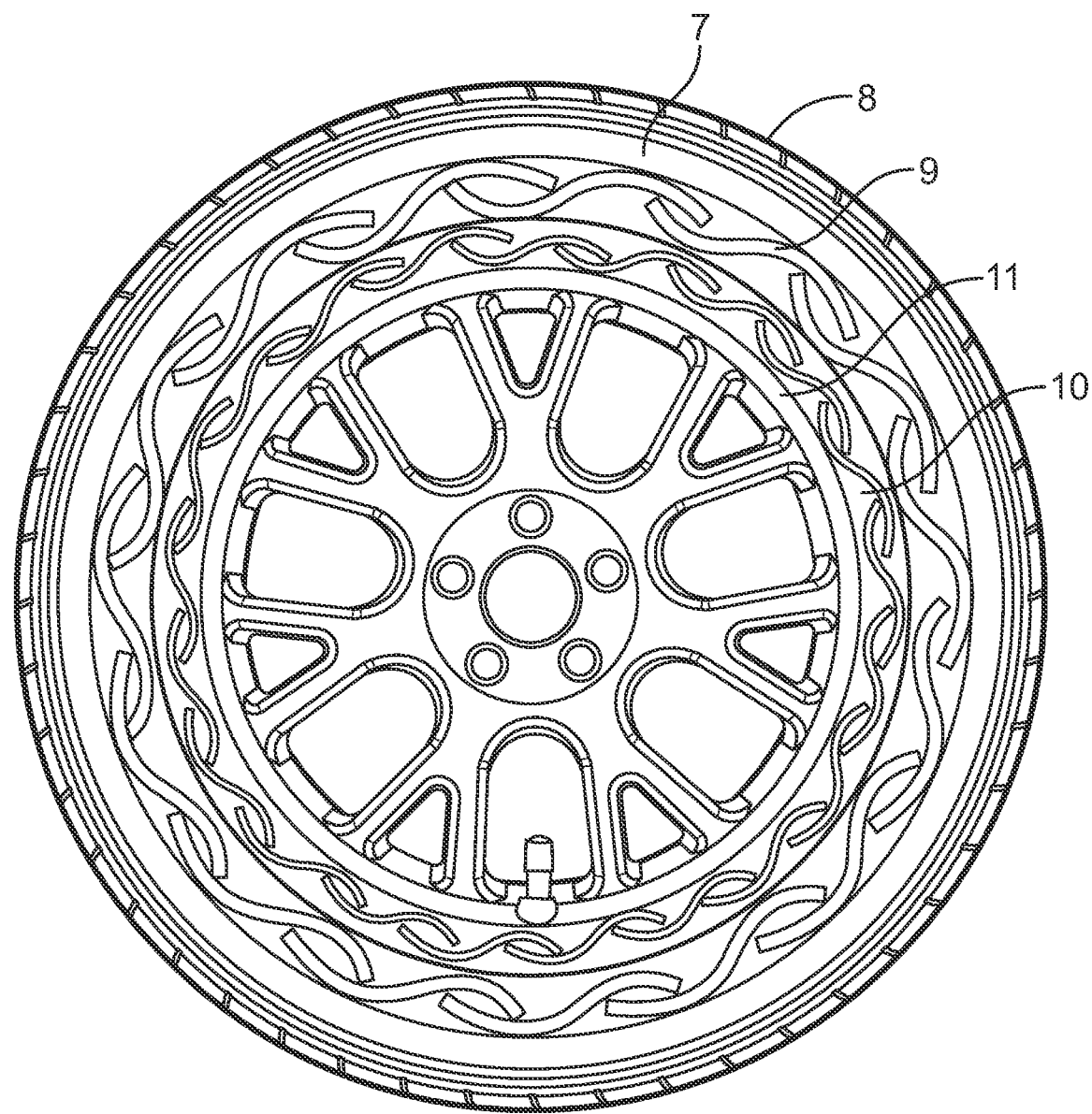
FIG. 2 is a side view of the hybrid tire of the instant invention.
Figure 3:
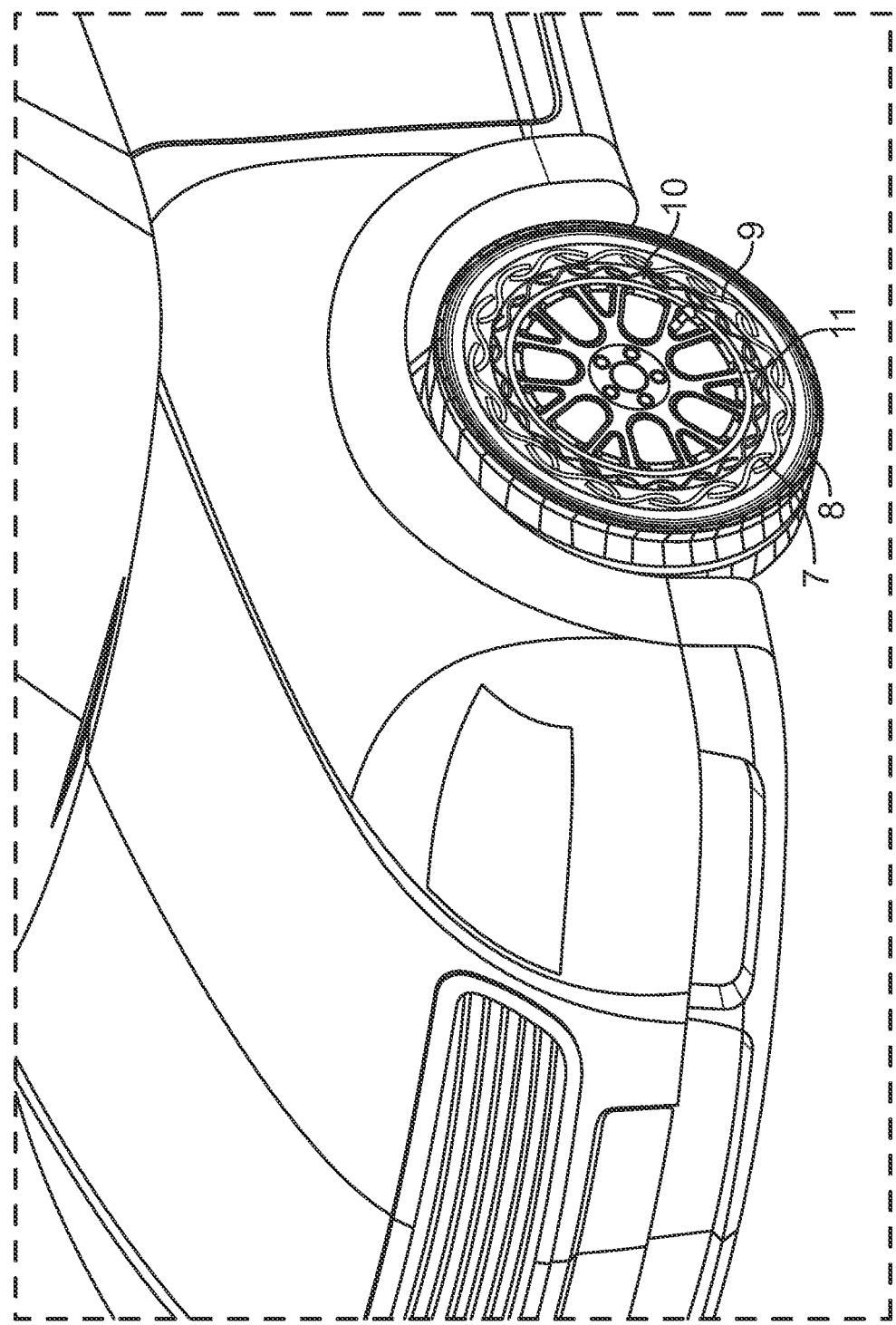
FIG. 3 is a perspective view of the hybrid tire of the instant invention as affixed to a vehicle.
Figures 4A, 4B:
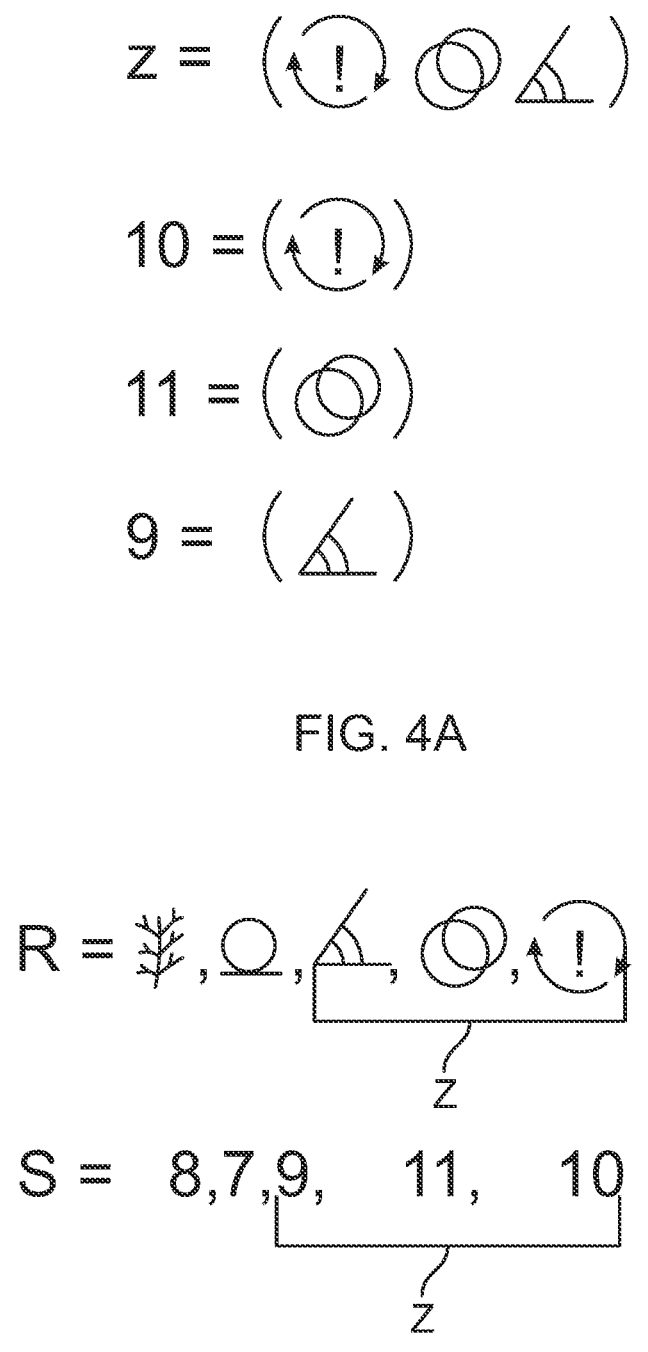

FIG. 2 shows a different view of these components. Viewing from the inside out, the tire contains beads 11 on either side of the tire that are adjacent to the air pocket section 10, which is then adjacent to a shear band 7 which is closest to the tire tread 8. FIG. 3 shows these same components as the tire is attached to a vehicle. FIGS. 4A-4B show graphical representations of the various components as they have been numbered. Z illustrates the novel conjunction of components in the invention. This is a combination of the elements air pocket 10, beads 11 and compression section 9 around the elastomeric flection design framework. R illustrates all of these components in visual form while S illustrates the sections in number form.

Figure 5:
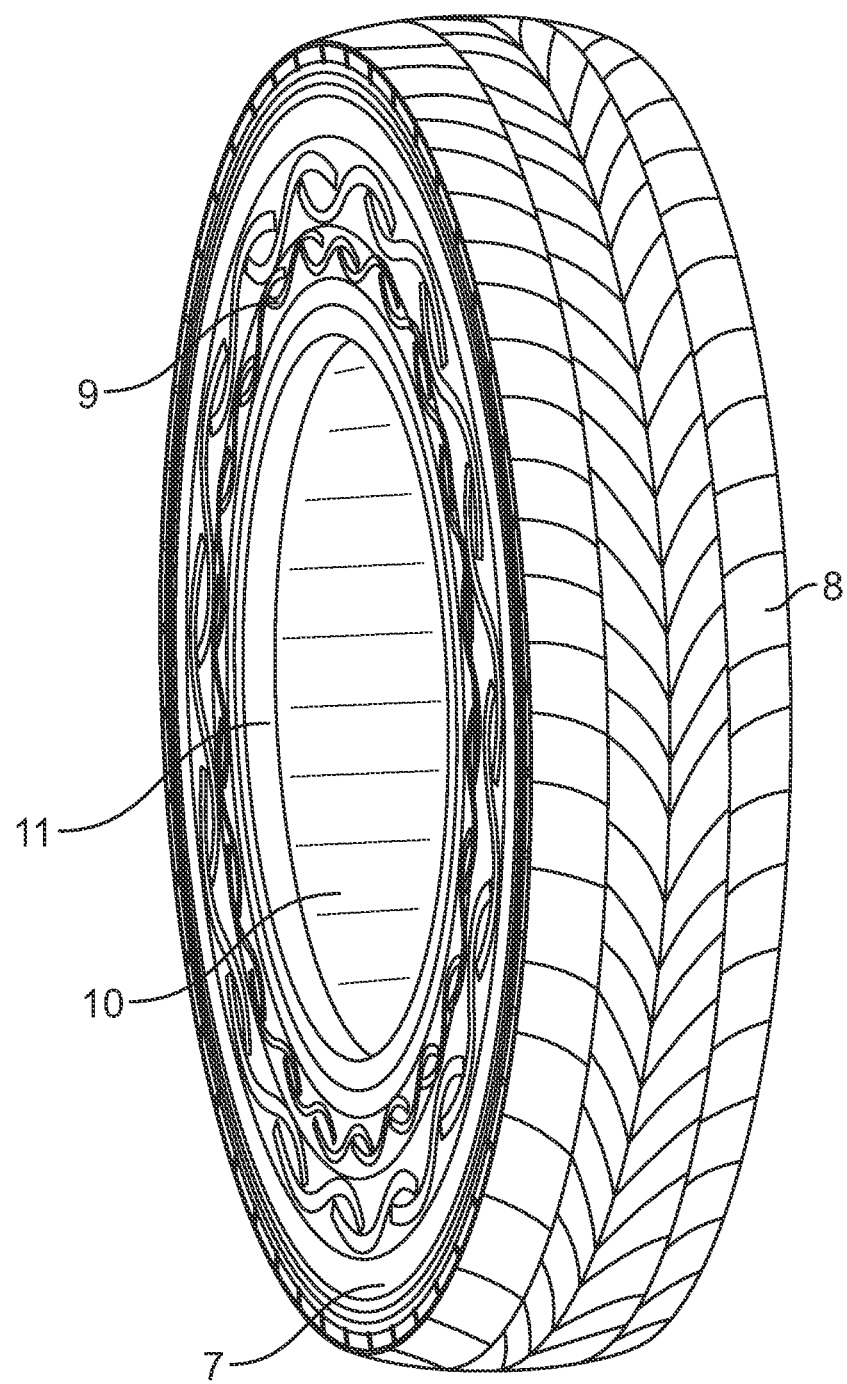
FIG. 5 is a side angled view of the tire of the instant invention in a vertical orientation.
Figure 6:
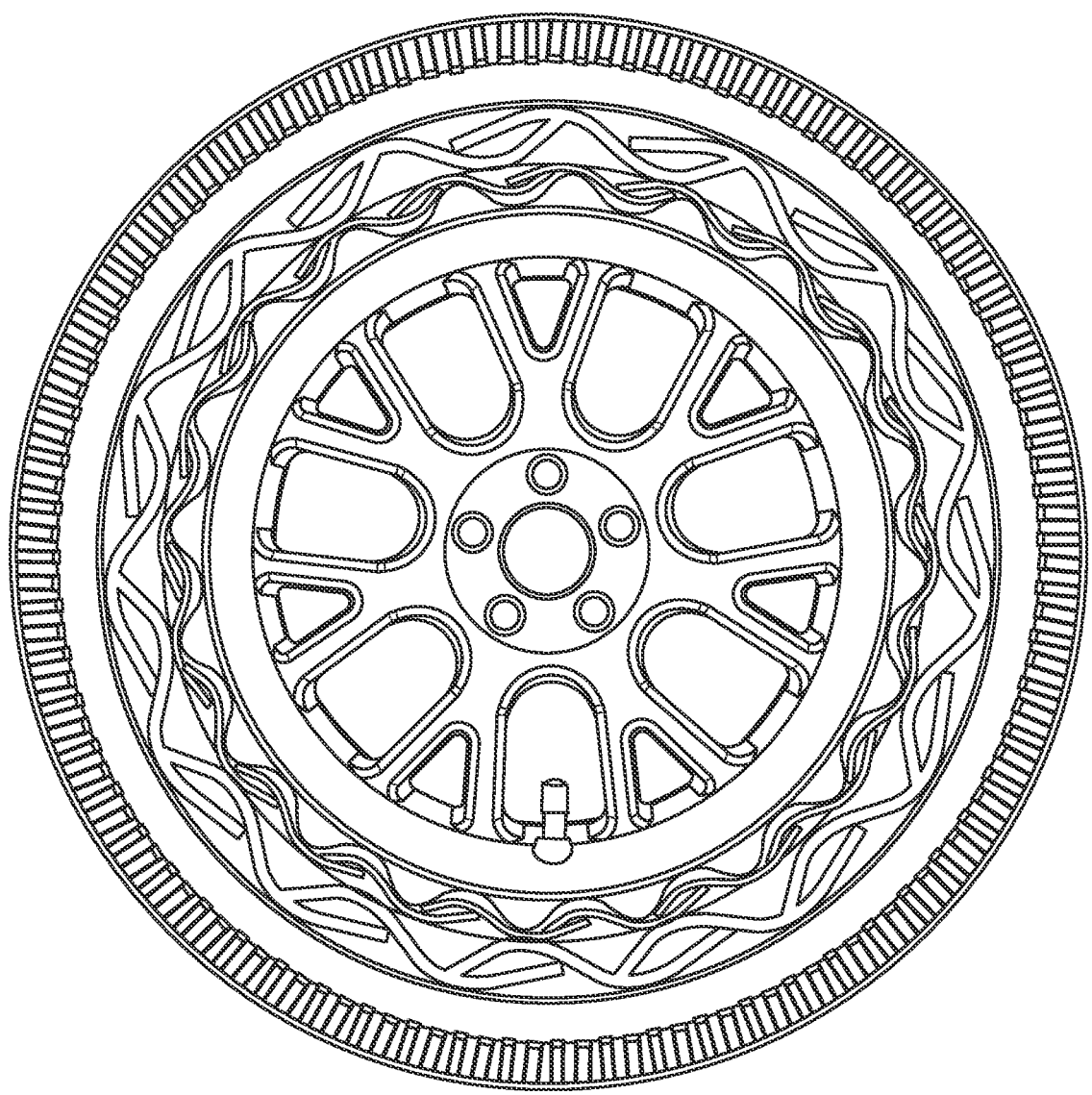
FIG. 6 is another side view of the hybrid tire of the instant invention.
Figure 7:
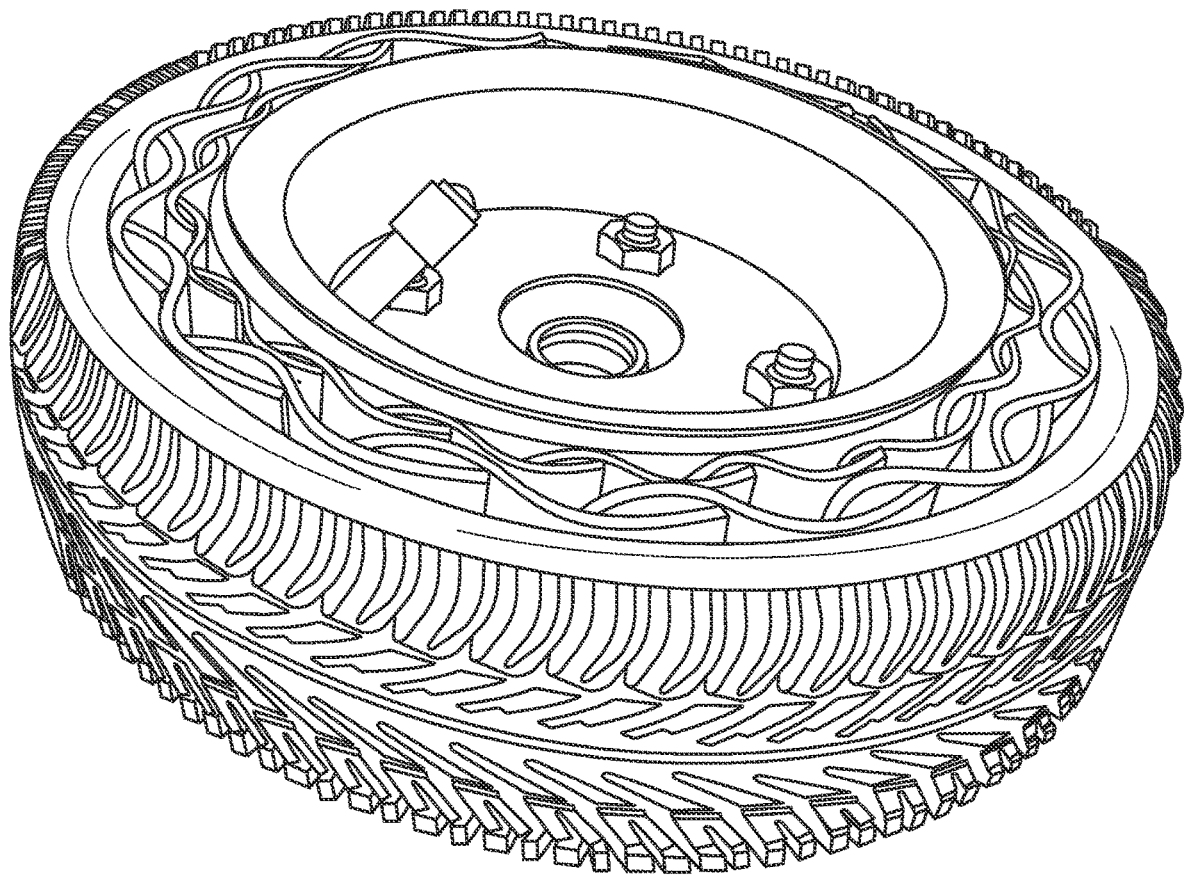
FIG. 7 is an angled view of the tire of the instant view in a horizontal orientation.
Figure 8:
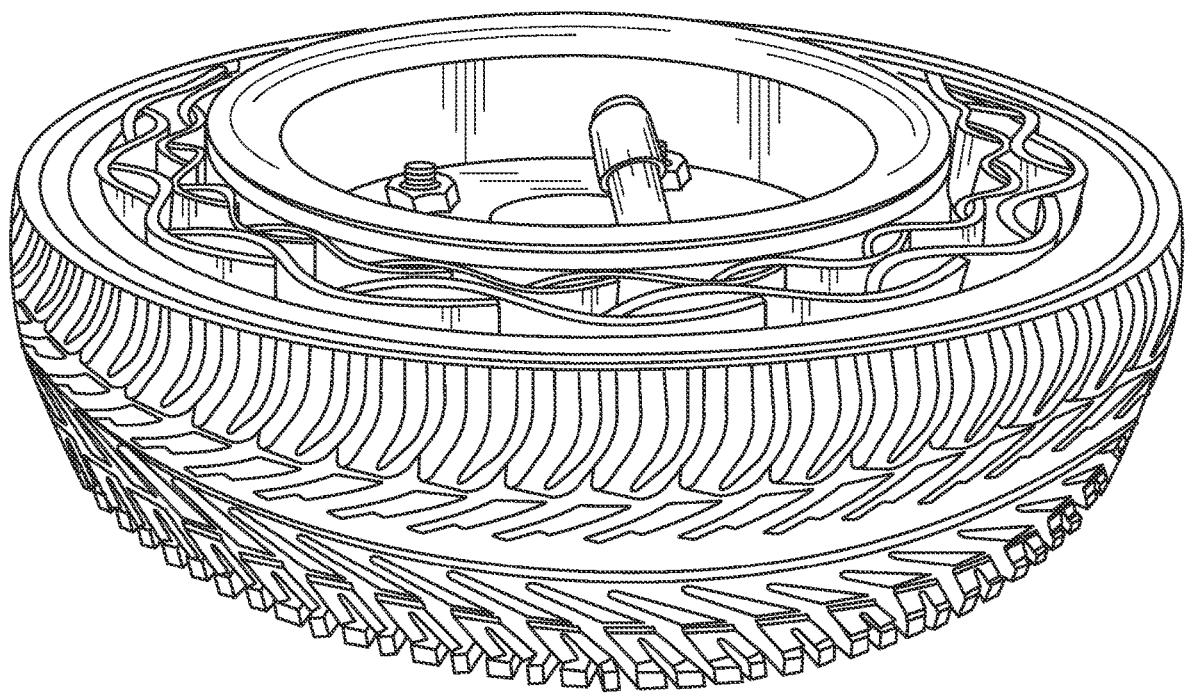
FIG. 8 is similar to FIG. 7 but from a different perspective.
Figure 9:
FIG. 9 is a cut out view of the tire of the instant invention demonstrating the reinforcing flexible apparatus network that defines the framework embodying the tire.

FIG. 5 shows these same components from an angled perspective view. FIGS. 7-8 show different angles of the tire identifying the components. FIG. 9 shows an example of how a cut out view of the aforementioned reinforcing flexible apparatus embodying the tire can look. The reinforcing flexible apparatus network defines the framework embodying the tire.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

While specific embodiments have been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A hybrid tire that provides sections for use with vehicles comprising:
   an outside surface in the shape of a circle composed of tread where the tire contacts a road;
   a shear band adjacent said tread;
   a compressible area adjacent said shear band wherein art elastomeric flection design is contained that can expands and retracts with the application of pressure;
   an air pocket adjacent said compressible area;
   a pair of beads adjacent said air pocket on either side of said tire for securing said tire to a rim.

2. The hybrid tire of claim 1 wherein said rim is equipped with a tire pressure monitoring sensor.

3. The hybrid tire as defined in claim 1 wherein said air pocket is pneumatically filled with air.

4. The hybrid tire as defined in claim 1 wherein a network apparatus is used to affix said outside surface, said shear band, compressible area and said air pocket, and two beads wherein said network apparatus allows the tire to maintain integrity, even with penetration to the core pneumatic pocket.

5. The hybrid tire as defined in claim 1 wherein said tire is reinforced with additives and reinforcements for greater strength and durability.

* * * * *